Dec. 1, 1959  R. W. FRITTS  2,915,724
ELECTRICAL DEVICE
Filed June 6, 1957

INVENTOR.
Robert W. Fritts
BY Seegert & Schwalbach
Att'ys 2,915,724
Patented Dec. 1, 1959

United States Patent Office

2,915,724
ELECTRICAL DEVICE

Robert W. Fritts, Elm Grove, Wis., assignor, by mesne assignments, to Minnesota Mining and Manufacturing Company, St. Paul, Minn., a corporation of Delaware Application June 6, 1957, Serial No. 664,109

21 Claims. (Cl. 338—23)

This invention relates to improvements in electrical devices which may be characterized broadly as electrical signal amplifiers, and which more particularly take the form of composite thermoelectric heat pump-thermistor assemblies.

A thermistor is a resistance type of electrical circuit element comprising a body of material having a high temperature coefficient of resistance which is usually negative in character, one type, for example, exhibiting a change of as much as 8% in resistance per degree centigrade change in the temperature thereof within a given range. Peltier thermoelectric heat pumps, on the other hand, provide a low impedance electroresponsive means for heating or cooling at a given thermojunction thereof depending upon the polarity of a direct current flowing therethrough and whether the heat pump thermoelements are of positive or negative type. Heat pumps made of certain semi-metallic materials exhibit high heat pumping ability. With this in mind, it is a general object of the present invention to provide an improved electrical device having a low impedance input circuit and having an output circuit adapted for connection to an external circuit and affording highly sensitive control of the current flow therethrough, said device affording, in response to a predetermined relatively small change in the magnitude of current flowing in the input circuit, an amplified change in the magnitude of current which can flow in the output circuit.

Another object of the invention is to provide an improved electrical device of the class described which is adaptable equally well to control the flow of alternating or direct current flow in the output circuit thereof.

Another object of the invention is to provide an improved electrical device of the aforementioned character which, while being highly sensitive to changes in D.C. current flow through its input circuit, is substantially immune to flow therethrough of an alternating current, and by virtue of this characteristic is well adapted for use, for example, as a circuit monitor affording detection and highly sensitive response to the presence of any direct current component on a monitored alternating current circuit.

A more specific object of the invention is to provide an improved electrical device of the aforementioned character wherein the output circuit comprises a thermistor having a high negative temperature coefficient of resistance, and the input circuit comprises a thermoelectric heat pump having thermojunction means in heat transfer relation with said thermistor and operable to vary the temperature and thereby substantially vary the resistance of said thermistor in response to current flow through said heat pump.

Still another object of the invention is to provide an improved electrical device of the character described which is operable to integrate an input signal over a period of time, the output resistance change thereof being a measure of the total charge flowing through the input circuit, i.e. the heat pump over the given period.

Another object of the invention is to provide an improved composite heat pump-thermistor assembly, the sensitivity of which is enhanced by an arrangement of the parts thereof in a manner to minimize the effect of thermal lag and of the ambient temperature.

Still another object of the invention is to provide an improved electrical device of the aforementioned character which is sensitive not only to variations in the magnitude of the input current, but is even more highly sensitive to changes in the polarity of said current.

A further specific object of the invention is to provide an improved heat pump-thermistor assembly in which the output circuit comprises a pair of thermistors, one of which is heated to thereby substantially reduce the resistance thereof, and the other of which is cooled to substantially increase the temperature thereof in response to current flow through the input circuit, said structure being particularly well adapted for use in highly sensitive bridge circuits.

Another object of the invention is to provide an improved heat pump-thermistor assembly of the character described having the novelty and advantages set forth and characterized by its simplicity of construction, its economy of manufacture, its adaptability for use with different circuits, and its effectiveness for accomplishing the results set forth.

The specific illustrations and corresponding description herein set forth are used for the purpose of disclosure only and are not intended to impose unnecessary limitations on the claims, or to confine the patented invention to a particular use. In the drawing accompanying and forming part of this specification:

Figure 1:
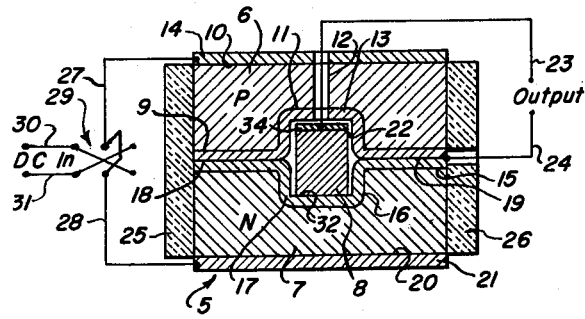
Figure 1 is a vertical sectional view of one form of the improved electrical device, the electrical connections thereto being shown semi-diagrammatically.

Referring more particularly to Figure 1 of the drawing, the numeral 5 indicates a composite heat pump-thermistor assembly comprising dissimilar (i.e., P and N type) heat pump thermoelements 6 and 7 and a thermistor 8. The thermoelement 6 has an inner surface 9 and outer surface 10, said element having a recess or depression 11 formed in the surface 9 and also being formed with a bore 12 communicating between said depression and the outer surface 10. Overlaying and conforming to the contour of the surface 9 and depression 11, is a thermally and electrically conductive thermojunction member 13 which may be bonded, as by soldering, to the element 6. Overlaying the outer surface 10 of the element 6 is a thermally and an electrically conductive thermojunction member 14 which may be bonded, as by soldering, to the surface 10.

The thermoelement 7 is preferably complementary to the thermoelement 6 and is therefore similarly shaped, being provided with an inner surface 15, a recess or depression 16, and thermally and electrically conductive inner and outer thermojunction members 17 and 21 bonded, as by soldering, to the thermoelement 7 at inner surface 15 and depression 16 and at outer surface 20, respectively, as shown. The thermojunction members 13 and 17 and thereby the thermoelements 6 and 7 are electrically joined, as by soldering or brazing, at surfaces 18 and 19.

As shown in the drawing, the depressions 11 and 16 of thermoelements 6 and 7 respectively are aligned to provide an enclosed chamber or oven 22 for the thermistor 8. The thermistor 8 preferably has one end surface thereof bonded, as by soldering, to the thermojunction member 17 at surface portion 32 thereof to provide an electrical and thermal connection therebetween, and is out of engagement with but in close proximity to the surface portions of the thermojunction member 13 and the other surface portions of the thermojunction member 17 defining the oven 22. Means is provided for connecting the thermistor 8 into an external circuit, said means comprising a conductor 23 entering the bore 12 and electrically connected to an electrically conductive terminal member 34 bonded, as by soldering, to the end surface of the thermistor 8 opposite the end thereof bonded to the thermojunction member 17 at 32. A conductor 24 is electrically connected to one or both of the thermojunction members 13 and 17 as shown, and the exposed side wall portions of the thermoelements 6 and 7 are preferably overlaid with thermoinsulation 25 and 26 having suitable openings for passage therethrough of the conductors 23 and 24.

Means is provided for connecting the heat pump comprising thermoelements 6 and 7 in circuit with a source of energizing direct current, or, for example, an alternating current circuit to be monitored. The aforementioned means illustrated takes the form of conductors 27 and 28 connected to the thermojunction members 14 and 21 and also to a reversing switch 29, the latter being connected in circuit with the source or input by means of conductors 30 and 31 as shown.

As aforementioned, the thermoelements 6 and 7 are preferably of dissimilar character, for example, the element 6 may be of material exhibiting positive electrical characteristics, whereas the element 7 may be of material exhibiting negative electrical characteristics. More specifically, it is preferred that the thermoelements 6 and 7 be of materials which exhibit a high Peltier coefficient, low thermal conductivity and low electrical resistivity. The low electrical resistivity affords the heat pump circuit desirable low impedance characteristics. More specifically, thermoelements 6 and 7 may be of the materials described in the copending application of Robert W. Fritts and Sebastian Karrer, Serial Number 512,436, filed June 6, 1956, and assigned to the assignee of the present application. Such materials are semimetallic alloys or compositions which may be characterized as binary metallic compounds of slightly imperfect composition, i.e., containing beneficial impurities constituting departures from perfect stoichiometry by reason of an excess of one of the metals over the other and/or containing beneficial impurity substances denominated "promoters." Such semimetallic compositions also include mixtures of such binary metallic compounds, which may be denominated ternary metallic alloys or compositions. Certain of these alloys or compositions exhibit negative and certain exhibit positive electrical characteristics.

A negative thermoelement may, for example, be formed of an alloy comprising lead and at least one member of the group tellurium, selenium and sulphur. For example, a negative thermoelement of lead-selenium-tellurium composition could include a tellurium-selenium constituent in which the selenium is but a trace. In this case, such constituent should constitute from 35% to 38.05% by weight of the composition, the balance (61.95% to 65% by weight) being lead. At the other extreme where the tellurium-selenium constituent consists almost entirely of selenium with but a trace of tellurium, such constituent should comprise from 25% to 27.55% by weight of the final composition, the remainder (from 72.45% to 75% by weight) being lead. Between these extremes, the selenium-tellurium constituent varies linearly with the ratio of selenium to tellurium (expressed in atomic percent) in the selenium-tellurium constituent.

A negative thermoelement may also be formed of an alloy of lead, selenium and sulphur. For example, a thermoelement of lead-selenium-sulphur composition could consist of a selenium-sulphur constituent in which the sulphur is but a trace. In this case, such constituent should constitute from 25% to 27.55% by weight of the composition, the balance (75% to 72.45% by weight) being lead. At the other extreme, where the selenium-sulphur constituent consists almost entirely of sulphur with but a trace of selenium, such constituent comprises from 12.8% to 13.37% by weight of the final composition, the remainder (from 87.2% to 86.63% by weight) being lead. Between these two extremes, the selenium-sulphur constituent varies linearly with the ratio of selenium to sulphur (expressed in atomic percent) in the selenium-sulphur constituent. With regard to the aforementioned compositions, it will be observed that in each case there is an excess of lead over and above the amount thereof necessary for satisfying the stoichiometric proportions of the compound formed in the second constituent or constituents, i.e., the tellurium, selenium or sulphur. For example, a composition consisting substantially of lead and selenium can contain up to 10.4% lead by weight of the total composition over and above the 72.41% lead by weight stoichiometrically necessary for combination with selenium.

The electrical characteristics of the aforementioned semi-metallic alloys, desirable, for example, in thermoelements for heat pump application can be markedly and advantageously altered in a reproducible manner by the addition thereto of controlled amounts of matter other than the constituents of the base composition. Such compositions may also be denominated "beneficial impurities" as distinguished from undesirable impurities. For convenience, these additions are designated "promoters," since they tend to enhance the electrical characteristics desired for the particular application of the base compositions.

As has previously been observed, all of the aforedescribed base compositions exhibit negative Peltier E.M.F. and negative conductivity. By the addition of certain "promoters," such negative properties may be enhanced, while the polarity of the electrical properties of the base compositions may be reversed by the addition of certain other "promoters" to provide a semi-metallic composition having positive electrical characteristics, i.e., positive conductivity and Peltier E.M.F.

The aforementioned copending application of Robert W. Fritts and Sebastian Karrer gives a complete description of the beneficial impurities, including both departures from perfect stoichiometry and promoters, which have been found to be effective for improvement of the electrical properties of semi-metallic thermoelectric elements for heat pump application when added to the aforementioned base compositions in minor amounts. For example, up to a maximum of 6.9% by weight of beneficial impurity including 3.9% excess lead and 3.0% promoter for promoted compounds and a maximum of 10.4% by weight of beneficial impurity for unpromoted compositions.

The proportions and ranges of the various constituents aforementioned and particularly the minimum limits of lead constituent in the compositions, must be regarded as critical if the composition is to have the electrical properties desired in thermoelectric heat pump elements. If the lead content is significantly less than the minimum amount indicated for any particular selenium-tellurium or selenium-sulphur proportion, the desired values of Peltier E.M.F. and resistivity will not be afforded and the significant electrical and mechanical properties will not be reproducible. On the other hand, if the lead content for any composition appreciably exceeds the aforementioned maximum limit, the resulting composition is too metallic in nature to afford satisfactory electrical characteristics for the purposes of the present invention.

A positive thermoelement may also be formed of an alloy of lead and tellurium in which there is an excess of tellurium over and above the amount thereof necessary for satisfying the stoichiometric proportions of the compound lead-telluride. Such alloy or composition should consist essentially of lead and tellurium in which lead is present in the range of 58.0% to 61.8% by weight and the balance in the range of 42.0% to 38.2% by weight tellurium. It will be observed that in this case there is an excess of tellurium over and above the amount thereof necessary for satisfying the stoichiometric proportions.

As has been previously observed, the tellurium rich base lead-tellurium compositions exhibit positive Peltier E.M.F. and positive conductivity. The electrical characteristics of this compound, desirable, for example, in thermoelements for heat pump applications, can also be markedly and advantageously altered in a reproducible manner by addition thereto of "promoters." The aforementioned copending application of Robert W. Fritts and Sebastian Karrer gives a complete description of the beneficial impurities, including both departures from perfect stoichiometery and promoters, which have been found to be effective for improvement of electrical properties of semi-metallic thermoelectric elements for heat pump applications when added to the aforementioned tellurium rich base lead-tellurium compositions. For example, up to a maximum of 5.5% by weight of beneficial impurity including 4.9% excess tellurium and 0.60% promoter for promoted compounds and a maximum of 6.7% by weight of beneficial impurity for unpromoted compositions.

The proportions and ranges of the various constituents aforementioned and particularly the minimum limits of tellurium in the compositions, must be regarded as critical if the composition is to have the electrical properties desired in thermoelectric heat pump elements. If the tellurium content is significantly less than the minimum amount indicated, the desired values of Peltier E.M.F. and resistivity will not be afforded and the significant electrical and mechanical properties will not be reproducible. On the other hand, if the tellurium content appreciably exceeds the aforementioned maximum limits, the resulting composition will not afford satisfactory electrical characteristics for the purposes of the present invention.

Not only are the proportions and ranges aforedescribed to be considered critical, but so also is the purity. More specifically, the limit of tolerable metallic impurity in the final composition of the aforedescribed thermoelectric elements has been found to be of the order of 0.01%, and the composition must be substantially oxygen free, if the mechanical and electrical properties desired are to be obtained and are to be reproducible. In the case of promoted compositions, however, the limit of tolerable impurity is 0.001%.

Current flow through a thermoelement which exhibits positive electrical characteristics causes heat to be pumped therethrough in the direction of the current flow, and conversely, current flow through a thermoelement which exhibits negative electrical characteristics causes heat to be pumped therethrough in the direction opposite to the direction of the current flow. On flow of direct current through the device shown in Figure 1 from the conductor 27 to the conductor 28, i.e., via the thermojunction member 14, thermoelement 6, thermojunction members 13 and 17, thermoelement 7 and thermojunction member 21, heat is absorbed from the ambient atmosphere at the thermojunction members 14 and 21 and is pumped inwardly through thermoelements 6 and 7 to the thermojunction members 13 and 17 for liberation within the chamber 22 to raise the temperature of the thermistor 8 within said chamber. Conversely, on flow of direct current through the device from the conductor 28 to the conductor 27, heat is absorbed at thermojunction members 13 and 17 and is pumped outwardly through the thermoelements 6 and 7 to the thermojunction members 14 and 21 for liberation to the ambient atmosphere by convection and radiation. The absorption of heat at the thermojunction members 13 and 17 reduces the temperature of the thermistor 8 within the chamber 22.

As aforementioned, the thermoelements 6 and 7 are characterized by a high Peltier coefficient, low thermal conductivity and low electrical resistivity. The low electrical resistivity affords the input circuit of the device 5 low impedance. In contrast to this, the thermistor 8 has relatively high electrical resistivity along with a large negative temperature coefficient of electrical resistivity affording the output circuit a highly sensitive response in terms of electrical resistivity change per unit change in temperature of the thermistor 8 produced by a change in direct current flow through the heat pump elements 6 and 7.

The thermistor 8 may be of material of the type disclosed in the copending application of Russell E. Fredrick, Robert W. Fritts and Clarence R. Manser, Serial Number 629,326, filed December 19, 1956, and assigned to the assignee of the present application. The material disclosed in the aforementioned application takes the form of a non-stoichiometric binary intrinsic semiconductor crystal of indium and tellurium consisting essentially of from 37.60% to 38.50% by weight of indium, the balance being substantially all tellurium, and containing less than 0.1% residual impurity. This crystal may be produced by melting the indium and tellurium constituents in the proportions stated under an atmosphere of hydrogen, casting the reaction product into ingots, and then annealing the ingots under hydrogen at about 550° C. for about fifteen hours. The ingot surfaces not directly contacted in the device 5 are preferably coated with a resin or varnish having high electrical resistivity in order to prevent formation of an oxide surface layer of lower resistance tending to short-circuit the ingot.

Figure 2:
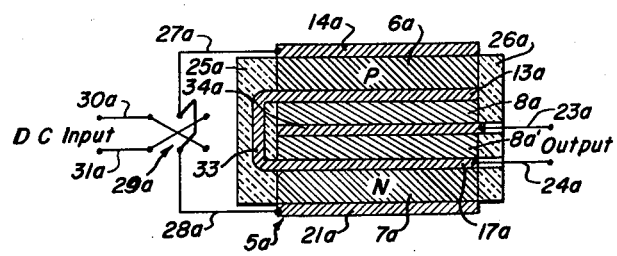
Figure 2 is a view similar to Figure 1 showing another form of the improved electrical device.

Figure 2 illustrates another form of thermoelectric heat pump-thermistor assembly 5a, the parts thereof indicated by numerals with the suffix a corresponding to the parts of the assembly shown in Figure 1 indicated by the same numerals without a suffix. The assembly 5a comprises dissimilar thermoelements 6a and 7a having interposed therebetween a pair of substantially flat thermistors 8a and 8b. The thermoelements 6a and 7a are electrically joined by a U-shaped thermally and electrically conductive thermojunction member 33 having leg portions 13a and 17a bonded, as by soldering, to the inner surfaces of thermoelements 6a and 7a respectively. The inner surfaces of the leg portions 13a and 17a are bonded, as by soldering, to the outer surfaces of the thermistor members 8a and 8b, and the inner surfaces of said thermistor members are bonded, as by soldering, to an electrode 34 interposed therebetween. Thermojunction members 14a and 21a are bonded, as by soldering, to the outer surfaces of thermoelements 6a and 7a respectively. As shown, the exposed side wall portions of the thermoelements and thermistor members are overlayed with thermal insulation 25a and 26a.

Thermoelements 6a and 7a and thermojunction members 14a, 33 and 21a comprise a Peltier heat pump, and conductors 27a and 28a may connect said heat pump through a reversing switch 29a and conductors 27a and 28a to a source of direct current, or, for example, to an A.C. circuit to be monitored. Conductors 23a and 24a connected respectively to the electrode 34 and thermojunction member 33 afford a means for connecting thermistor elements 8a and 8b to an output or external circuit in parallel relation.

In the operation of the device 5a current flow therethrough from the conductor 27a to the conductor 28a via thermojunction member 14a, thermoelement 6a, thermojunction member 33, thermoelement 7a and thermojunction member 21a causes heat to be pumped inwardly through the thermoelements 6a and 7a, said heat being absorbed at thermojunction members 14a and 21a and being emitted at legs 13a and 17a of the thermojunction member 33 for absorption by the thermistor members 8a and 8b, raising the temperature thereof, and thereby substantially reducing the resistance of the circuit including said thermistor members. Conversely, direct current flow through the device 5a from the conductor 28a to the conductor 27a causes heat to be pumped outwardly through thermoelements 6a and 7a, said heat being absorbed at the leg portions 13a and 17a of thermojunction member 33 and being emitted at thermojunction members 14a and 21a with the result that the temperature of the thermistor members 8a and 8b is reduced and the resistance of the circuit containing said members is substantially increased.

Figure 3:
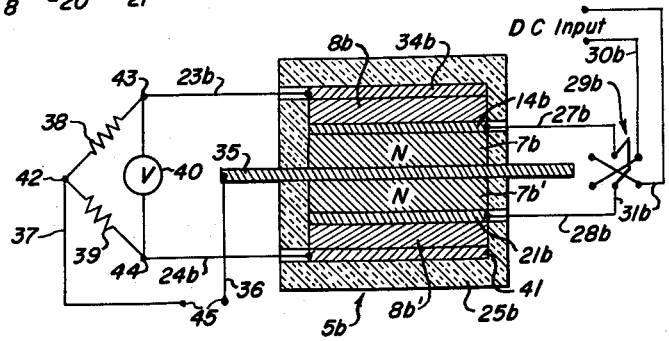
Figure 3 is a view similar to Figures 1 and 2 showing still another form of improved electrical device having a dual thermistor output circuit.

Figure 3 illustrates another form of composite thermoelectric heat pump-thermistor assembly 5b which is adapted for use, for example, in bridge circuits and affords said circuits extreme sensitivity. The device 5b comprises a pair of spaced preferably flat thermistor members 8b and 8b' having a heat pump in the form of a pair of similar thermoelements 7b and 7b' interposed therebetween. While the thermoelements 7b and 7b' are indicated as having negative electrical characteristics, they may, if desired, be of material having positive electrical characteristics. The inner surfaces of the thermoelements 7b and 7b' are joined, as by soldering to a thermally and electrically conductive terminal and heat transfer member 35, and the outer surfaces of the thermoelements 7b and 7b' are joined, as by soldering to thermojunction members 14b and 21b respectively. The outer surfaces of the thermojunction members 14b and 21b are joined, as by soldering to the thermistor members 8b and 8b' respectively, and the outer surfaces of the thermistors 8b and 8b' are joined, as by soldering, to therminal members 34b and 41 respectively. Conductors 27b and 28b afford means for connection of the thermojunction members 14b and 21b in circuit with a source of direct current, or, for example, with an A.C. circuit to be monitored through a reversing switch 29b and conductors 30b and 31b.

The device shown in Figure 3 is illustrated diagrammatically as forming a part of the bridge circuit comprising a pair of resistance elements 38 and 39 connected to each other and to a conductor 37 at 42. The other end of resistance member 38 is connected at 43 to one terminal of a voltmeter 40 and to a conductor 23b in circuit with terminal member 34b. The other end of the resistance member 39 is connected at 44 to the other terminal of the voltmeter 40 and to a conductor 24b in circuit with terminal member 41. A conductor 36 connects the terminal member 35 in circuit with a source 45 of alternating or direct current the other terminal of which the conductor 37 is connected.

It will be observed that in circuitry illustrated in Figure 3 portions of the device 5b form part of the two legs of the bridge opposite the resistances 38 and 39, one of said legs comprising the conductor 23b, terminal member 34b, thermistor 8b, thermojunction member 14b, thermoelement 7b and the terminal member 35. The other leg of the bridge comprises the conductor 24b, terminal member 41, thermistor 8b', thermojunction member 21b, thermoelement 7b' and terminal member 35. Thermistors 8b and 8b' are therefore in different legs of the bridge. A bridge circuit of the type disclosed is highly sensitive to any variation in the resistance of any one of its legs. Extreme sensitivity is lent to such a bridge by incorporation thereinto of thermistor elements 8b and 8b' each having a high negative temperature coefficient of resistivity and in heat transfer relation with thermojunctions of heat pump means including elements 7b and 7b' having high thermoelectric power and arranged to pump heat directly from one of the thermistor elements to the other. This simultaneously cools one thermistor and heats the other, thereby substantially increasing the resistance of the cooled thermistor and substantially decreasing the resistance of the heated thermistor in response to direct current flow through said thermoelements in a given direction. Thus, the highly sensitive response, in terms of changes in the resistance or conductance of the thermistors, to slight variations in direct current flow through the heat pump are multiplied by the inherently high sensitivity of the bridge circuit to changes in resistance in any of its legs.

In the device 5b shown in Figure 3, as with the structures 5 and 5a shown in Figures 1 and 2, the flow of alternating current through the input circuit, i.e., between conductors 27b and 28b, has no substantial effect. The device is, however, highly sensitive to changes in the flow therethrough of a direct current, for example a direct current superimposed upon the current of an A.C. circuit being monitored by the device 5 and to which the conductors 27b and 28b may be connected. In the event of the flow of a direct current from the conductor 27b through thermojunction member 14b, thermoelement 7b, terminal member 35, thermoelement 7b', and thermojunction member 21b, heat is pumped through thermoelements 7b and 7b', in the direction opposite to the current flow in the event that the thermoelements are of N-type as shown, and in the direction of the current flow if said thermoelements are of positive polarity. Thus, with the negative thermoelements shown in Figure 3, current flow as aforestated causes heat to be absorbed from the thermistor 8b' at the thermojunction member 21b and to be pumped toward the thermojunction member 14b for liberation thereat and absorption by thermistor 8b.

Thus, the thermistor 8b' is cooled and the thermistor 8b is simultaneously heated with the result that the resistance of the thermistor 8b' is markedly increased and the resistance of the thermistor 8b is simultaneously markedly decreased. This simultaneously increases the resistance of one leg of the bridge and decreases the resistance of another leg of the bridge, and this action is, of course, instantly reflected in a change in the reading of the voltmeter 40.

In the event of flow of a direct current in the direction reverse to that heretofore explained, i.e., from the conductor 28b toward the conductor 27b, heat is pumped through thermoelements 7b and 7b' toward the thermistor 8b', said heat being absorbed at the thermojunction member 14b and being emitted at thermojunction member 21b for absorption by the thermistor 8b'. This, of course, results in cooling of the thermistor 8b and heating of the thermistor 8b' with corresponding substantial increase in the resistance of the thermistor 8b and decrease in the resistance of the thermistor 8b'. As aforementioned, this simultaneous change in the resistance of the thermistors 8b and 8b' is instantly sensed by the bridge circuit and is reflected in a substantial change in the reading of the voltmeter 40.

While the heat pumping is being carried on by the thermoelements 7b and 7b', the terminal and heat transfer member 35 tends to hold the mean temperature of the heat pump comprising thermoelements 7b and 7b' near ambient by conduction and convection as a result of exposure of the peripheral portions thereof to the ambient atmosphere. Further, the device 5b shown in Figure 3, by virtue of the heating of one thermistor and simultaneous cooling of the other afforded thereby, is substantially insensitive to ambient temperature.

By virtue of the thermally insulated character of the devices 5, 5a and 5b shown in Figures 1, 2 and 3, said devices are operable to integrate a direct current input signal over any given period of time, said current being operable to cause pumping of heat by the heat pump elements with resultant change in the temperature of the thermistor or thermistors, the resultant change in the resistance of the thermistors being a measure of the total charge flowing through the heat pumps during the given period. The length of time over which such integration may be accomplished depends upon such factors as the heat capacity of the thermistor or thermistors, of the contact elements and of the thermal insulation.

Various modifications, adaptations and alterations may be applied to the specific forms of the invention shown to meet the requirements of practice, without in any manner departing from the spirit or scope of the present invention, and all of such modifications, adaptations and alterations are contemplated as may come within the scope of the appended claims.

What is claimed as the invention is:

1. A composite heat pump-thermistor assembly comprising a thermistor element, a heat pump thermoelement having a thermally and electrically conductive thermojunction member in conductive engagement with said thermistor to afford heat transfer and electrical connection means for both said thermoelement and said thermistor, first terminal means affording with said thermojunction member means for connecting said thermistor into an external circuit, and second terminal means affording with said thermojunction member heat transfer means for said heat pump as well as means for connecting said heat pump into an energizing circuit.

2. A composite heat pump-thermistor assembly comprising a thermistor element, a pair of heat pump thermoelements having thermally and electrically conductive thermojunction means in conductive engagement with said thermistor to afford heat transfer and electrical connection means therebetween, first terminal means affording with said thermojunction means external electrical connections for said thermistor, and second terminal means on said thermoelements affording heat transfer and external connection means for said heat pump.

3. A composite heat pump-thermistor assembly comprising a pair of thermistors characterized by a high rate of resistance change per unit change in temperature, and heat pump means having thermojunction means disposed in heat transfer relation with said thermistors, whereafter on energization of said heat pump means heat is pumped thereby and the temperature of said thermistors is varied by the transfer of heat through said thermojunction means to effect substantial changes in the resistance of said thermistors.

4. A composite heat pump-thermistor assembly comprising a pair of thermistors characterized by a high rate of resistance change per unit change in temperature, and heat pump means having thermojunction means including portions disposed in heat transfer relation with said thermistors, the arrangement of said thermojunction portions being such with respect to said thermistors that on energization of said heat pump means heat is pumped thereby and the temperature of each of said thermistors is varied in the same sense by the transfer of heat through said thermojunction means to thereby effect substantial changes of the same sense in the resistance of said thermistors.

5. A composite heat pump-thermistor assembly comprising a pair of thermistors characterized by a high rate of resistance change per unit change in temperature, and heat pump means having a pair of thermoelements connected by thermojunction means including portions disposed in heat transfer relation with said thermistors, the arrangement of said thermojunction portions being such with respect to said thermistors that on energization of said heat pump means heat is pumped thereby and the temperature of each of said thermistors is varied in the same sense by the transfer of heat between said thermoelements and thermistors through said thermojunction means to thereby effect substantial changes of the same sense in the resistance of said thermistors.

6. A composite heat pump-thermistor assembly adapted for use in bridge circuits or the like comprising a pair of thermistors characterized by a high rate of resistance change per unit change in temperature, and heat pump means having thermojunction means including a heat absorbing and a heat emitting portion disposed in heat transfer relation with said thermistors respectively, such that on energization of said heat pump means heat is pumped thereby to raise the temperature of one of said thermistors and lower the temperature of the other by the transfer of heat through said thermojunction means to effect a substantial decrease in the resistance of said one thermistor and a substantial increase in the resistance of said other thermistor.

7. A composite heat pump-thermistor assembly adapted for use in bridge circuits or the like comprising a pair of thermistors characterized by a high rate of resistance change per unit change in temperature, and heat pump means interposed between said thermistors and having heat absorbing and heat emitting thermojunction means disposed in heat transfer relation with thermistors respectively, such that on energization of said heat pump means heat is pumped thereby to raise the temperature of the thermistor at said heat emitting thermojunction and lower the temperature of the thermistor at said heat absorbing junction by the transfer of heat through said thermojunction means to effect a substantial decrease in the resistance of said one thermistor and a substantial increase in the resistance of said other thermistor.

8. A composite heat pump-thermistor assembly of high sensitivity comprising a pair of recessed complementary P-N type heat pump elements joined by thermal and electrically conductive thermojunction means with the recesses of said elements aligned to form a chamber with which said thermojunction means communicates, and a thermistor within said chamber characterized by a high rate of resistance change per unit change in temperature and having electrical and thermally conductive contact with said thermojunction means, wherefore upon flow of an energizing current through said heat pump heat is transferred between said thermistor and thermojunction means to effect a change in the temperature and thereby a substantial change in the resistance of said thermistor.

9. A composite heat pump-thermistor assembly of high sensitivity comprising: a P-type first thermoelement having an inner surface formed with a recess and having an outer surface, an internal thermojunction member overlaying and conforming to the shape of said recessed inner surface and joined thereto, an external thermojunction and terminal member overlaying and joined to said outer surface, an N-type second thermoelement complemental to said first thermoelement and also having an inner surface formed with a recess and having an outer surface, an internal thermojunction member overlaying and conforming to the shape of the recessed inner surface of said second thermoelement and joined thereto, an external thermojunction and terminal member overlaying and joined to the outer surface of said second element, said internal thermojunction members being electrically joined and arranged with the recesses of said thermoelements aligned to form an enclosing chamber, a thermistor disposed within said chamber in heat transfer relation with said thermojunction members and electrically connected to one of said members, and means affording with said one thermojunction member means for connecting said thermistor into an electrical circuit.

10. A composite heat pump-resistor assembly comprising a temperature sensitive resistor element, thermoelectric heat pump means comprising at least one heat pump thermoelement and thermally and electrically conductive thermojunction means in conductive engagement with said resistor to afford heat transfer and electrical connection means therebetween, first terminal means affording with said thermojunction means external electrical connections for said resistor, and means including second terminal means on said thermoelement affording heat transfer and external connection means for said heat pump.

11. A composite heat pump-resistor assembly comprising a temperature sensitive resistor element, thermoelectric heat pump means comprising at least one heat pump thermoelement and thermally and electrically conductive thermojunction means in thermally and electrically conductive engagement with said resistor to afford heat transfer and electrical connection means therebetween, first terminal means affording with said thermojunction means external electrical connections for said resistor, and means including second terminal means on said thermoelement affording heat transfer and external connection means for said heat pump adapted for connection of said heat pump to a source of energizing current independent of said resistor, such that current flow through said heat pump is independent of the resistance of said resistor.

12. A composite heat pump-resistor assembly comprising a pair of resistors characterized by a high rate of resistance change per unit change in temperature, and heat pump means having thermojunction means disposed in heat transfer relation with said resistors, wherefore on energization of said heat pump means heat is pumped thereby and the temperature of said resistors is varied by the transfer of heat through said thermojunction means to effect substantial changes in the resistance of said resistors.

13. A composite heat pump-resistor assembly comprising a pair of temperature sensitive resistors characterized by a high rate of resistance change per unit change in temperature, thermoelectric heat pump means having thermally and electrically conductive thermojunction means disposed in thermally and electrically conductive relation with said resistors, wherefore on energization of said heat pump means heat is pumped thereby and the temperature of said resistors is varied by the transfer of heat through said thermojunction means to effect substantial changes in the resistance of said resistors, and terminal means adapted for connection of said heat pump means to a source of energizing current independent of said resistors, such that energization of said heat pump means is independent of the resistance change in said resistors effected thereby.

14. A composite heat pump-resistor assembly comprising a pair of resistors characterized by a high rate of resistance change per unit change in temperature, and thermoelectric heat pump means having thermojunction portions disposed in heat transfer relation with said resistors, the arrangement of said thermojunction portions being such that on energization of said heat pump means heat is pumped thereby and the temperature of each of said resistors is varied in the same sense by the transfer of heat through said thermojunction means to thereby effect substantial changes in the resistance of said resistors.

15. A composite heat pump-resistor assembly comprising a pair of resistors characterized by high temperature coefficients of resistance of the same polarity, thermoelectric heat pump means having thermojunction portions disposed in heat transfer relation with said resistors, said thermojunction portions being so arranged that on energization of said heat pump means heat is pumped thereby and the temperature of each of said resistors is varied in the same sense by the transfer of heat through said thermojunction means to effect substantial changes of the same sense in the resistance of said resistors.

16. A composite heat pump-resistor assembly comprising a pair of resistors characterized by a high rate of resistance change per unit change in temperature, and thermoelectric heat pump means having heat absorbing and heat emitting portions disposed in heat transfer relation with said resistors respectively, such that on energization of said heat pump means heat is pumped thereby to raise the temperature of one of said resistors and lower the temperature of the other by the transfer of heat through said thermojunction means to effect substantial changes in the resistance of said resistors.

17. A composite heat pump-resistor assembly comprising a pair of resistors characterized by high temperature coefficients of resistance of the same polarity, thermo- electric heat pump means having heat absorbing and heat emitting thermojunction portions disposed in heat transfer relation with said resistors respectively, such that on energization of said heat pump means heat is pumped thereby to raise the temperature of one of said resistors and lower the temperature of the other by the transfer of heat through said thermojunction means to effect a substantial change in one sense in the resistance of said one resistor and a substantial change in the opposite sense in the resistance of said other resistor.

18. A composite heat pump-resistor assembly adapted for use in bridge circuits or the like comprising a pair of resistors characterized by a high rate of resistance change per unit change in temperature, and thermoelectric heat pump means having heat absorbing and heat emitting thermojunction means disposed in heat transfer relation with said resistors respectively, such that on energization of said heat pump means heat is pumped thereby from the resistor at the heat absorbing thermojunction to the resistor at the heat emitting thermojunction to raise the temperature of the resistor at said heat emitting thermojunction and lower the temperature of the resistor at said heat absorbing thermojunction by the transfer of heat from one of said resistors to the other to effect a substantial change in the resistance of both of said resistors.

19. A composite heat pump-resistor assembly adapted for use in bridge circuits or the like comprising a pair of resistors characterized by high temperature coefficients of resistance of the same polarity, and thermoelectric heat pump means having heat absorbing and heat emitting thermojunction means disposed in heat transfer relation with said resistors respectively, such that on energization of said heat pump means heat is pumped thereby from the resistor at the heat absorbing thermojunction to the resistor at the heat emitting thermojunction to raise the temperature of the resistor at said heat emitting thermojunction and lower the temperature of the resistor at said heat absorbing thermojunction by the transfer of heat from one of said resistors to the other to effect a substantial change in one sense in the resistance of said one resistor and a substantial change in the opposite sense the resistance of said other resistor.

20. A composite heat pump-resistor assembly of high sensitivity comprising a pair of recessed complementary P-N type heat pump elements joined by thermojunction means with the recesses of said elements aligned to form a chamber intersected by said thermojunction means, and a resistor within said chamber characterized by a high rate of resistance change per unit change in temperature and connected in circuit with said thermojunction means, first terminal means affording with said thermojunction means external electrical connections for said resistor, and second terminal means affording external electrical connection means for said heat pump.

21. A composite heat pump-resistor assembly of high sensitivity comprising a pair of recessed complementary P-N type heat pump elements joined by thermally and electrically conductive thermojunction means with the recesses of said elements aligned to form a chamber with which said thermojunction means communicates, and a resistor within said chamber characterized by a high rate of resistance change per unit change in temperature and having electrical and thermally conductive contact with said thermojunction means, wherefore upon flow of an energizing current through said heat pump heat is transferred between said resistor and thermojunction means to effect a change in the temperature and thereby a substantial change in the resistance of said resistor.

References Cited in the file of this patent

UNITED STATES PATENTS

| | | |
|---|---|---|
| 1,856,865 | Darrah | May 3, 1932 |
| 2,352,056 | Wilson | June 20, 1944 |

UNITED STATES PATENT OFFICE

CERTIFICATE OF CORRECTION

Patent No. 2,915,724 December 1, 1959

Robert W. Fritts

It is hereby certified that error appears in the printed specification of the above numbered patent requiring correction and that the said Letters Patent should read as corrected below.

Column 5, line 13, for "stoichiometery" read -- stoichiometry --; column 7, line 26, for "therminal" read --terminal--; column 10, line 12, after "with" insert -- said --.

Signed and sealed this 21st day of June 1960.

(SEAL)
Attest:

KARL H. AXLINE
Attesting Officer

ROBERT C. WATSON
Commissioner of Patents